US010769604B2

(12) United States Patent
Unnerstall

(10) Patent No.: US 10,769,604 B2
(45) Date of Patent: Sep. 8, 2020

(54) SYSTEM AND METHOD FOR ECOMMERCE TICKET SALES BASED ON SEAT OCCUPANCY

(71) Applicant: Mastercard International Incorporated, Purchase, NY (US)

(72) Inventor: Richard B. Unnerstall, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 430 days.

(21) Appl. No.: 15/860,419

(22) Filed: Jan. 2, 2018

(65) Prior Publication Data
US 2019/0205852 A1   Jul. 4, 2019

(51) Int. Cl.
| *G06Q 40/00* | (2012.01) |
| *G06Q 20/12* | (2012.01) |
| *G06Q 20/40* | (2012.01) |
| *G06Q 20/32* | (2012.01) |
| *G06Q 20/18* | (2012.01) |
| *G06Q 20/04* | (2012.01) |
| *G06Q 10/02* | (2012.01) |

(52) U.S. Cl.
CPC ............. *G06Q 20/12* (2013.01); *G06Q 10/02* (2013.01); *G06Q 20/045* (2013.01); *G06Q 20/18* (2013.01); *G06Q 20/3223* (2013.01); *G06Q 20/3224* (2013.01); *G06Q 20/4014* (2013.01)

(58) Field of Classification Search
None
See application file for complete search history.

(56) References Cited

U.S. PATENT DOCUMENTS

| 9,530,108 | B2 * | 12/2016 | Thomas | ................ | G06Q 10/02 |
| 2019/0114562 | A1 * | 4/2019 | Parry | .................... | G06Q 10/00 |

OTHER PUBLICATIONS

"TIcketsNow Interactive Seating Charts Help Fans Find and Buy World Series Tickets." PR Newswire Oct. 19, 2006.*
McLennan, S., "The Scrambel for the best seat in the house." Telegram & Gazette. Apr. 27, 2003.*
"ElectroTix Offers New Visual Approach to Selling Tickets on Internet." Business Wire, May 28, 1998.*

* cited by examiner

*Primary Examiner* — Olabode Akintola
(74) *Attorney, Agent, or Firm* — Hovey Williams LLP

(57) ABSTRACT

A system and method for sensing a seat occupancy by an individual and executing an ecommerce transaction via the individual's mobile device for the cost of a ticket based on the occupied seat. For example, an attendee enters a multiplex and chooses a theater and a seat from which to watch a movie, or a passenger enters a station and chooses a train and a seat in which to travel. In both cases, the occupancy of the seat is detected, an amount owed is determined based on the occupancy of the seat, and an ecommerce transaction is initiated via the mobile device to pay the amount. The determination of the amount may be delayed for a period after the individual has stopped moving to ensure they have made their final choice. The individual may be required to verify a relevant characteristic, such as age or membership in a discounted group.

20 Claims, 5 Drawing Sheets

SYSTEM AND METHOD FOR ECOMMERCE TICKET SALES BASED ON SEAT OCCUPANCY

FIELD

The present invention relates to systems and methods for selling and purchasing tickets, and more particularly, embodiments concern a system and method for sensing a seat occupancy by an individual and executing an ecommerce transaction via a mobile communications device of the individual for the cost of a ticket for occupying the seat.

BACKGROUND

It often desirable when engaging in ticket-based activities to avoid long lines for purchasing tickets. For example, lines for purchasing tickets at theaters to attend performances or at train stations to travel aboard trains can be long and slow. Further, once a ticket is purchased for, e.g., a particular theater in a multiplex cinema or a particular train in a station, the purchaser cannot switch theaters or trains without exchanging the ticket or purchasing a new one. This is especially true if the different locations are associated with different ticket prices. Further, even if ticket prices do not vary, the problem still arises if ticket sales are tracked to ensure sufficient capacity (e.g., each ticket sold for a particular theater or train is deducted from the remaining capacity of that theater or train until the maximum capacity is reached).

This background discussion is intended to provide information related to the present invention which is not necessarily prior art.

SUMMARY

Embodiments address the above-described and other problems by providing a system and method for sensing a seat occupancy by an individual (e.g., an attendee in a venue or a passenger in a mass transit vehicle) and executing an ecommerce transaction via a mobile communications device of the individual for the cost of a ticket for occupying the seat.

In a first embodiment, a system is provided for facilitating an ecommerce sale of a ticket to an individual based on a seat occupancy of the individual. The system may broadly comprise a software application, an initiation mechanism, a seat occupancy determining mechanism, and a computing device. The software application may be provided for downloading onto a mobile communications device, with the software application allowing the individual to specify an ecommerce payment method. The initiation mechanism may be configured to detect a presence of the mobile communications device. The seat occupancy determining mechanism may be configured to determine whether the individual has occupied a seat among a plurality of seats. The computing device may be configured to determine an amount owed by the individual based at least in part on the occupancy of the seat by the individual, and execute the ecommerce sale of the ticket via the software application using the ecommerce payment method to pay the amount owed.

Various implementations of the first embodiment may include any one or more of the following features. The initiation mechanism may include a gate configured to initiate an authentication process, and if the authentication process is successfully completed, allow the individual to proceed to the seat. The seat occupancy determining mechanism may be configured to determine a seat location of the seat occupied by the individual, and the computing device may be configured to determine the amount owed by the individual based at least in part on the seat location. The system may further include a point-of-sale transaction system configured to allow the individual to use the mobile communications device to purchase concessions. The computing device may be further configured to require the individual to verify a relevant characteristic of the individual. The relevant characteristic may be an age of the individual and/or a membership of the individual in a particular group. The computing device may be further configured to delay determining the occupancy of the seat for a delay period after the individual has stopped moving. The delay period may be between one minute and five minutes. The computing device may be further configured to account for an applicable discount when determining the amount owed.

In a second embodiment, a method is provided for facilitating an ecommerce sale of a ticket to an individual based on a seat occupancy of the individual. The method may broadly comprise the following. A software application may be provided for downloading onto a mobile communications device, with the software application allowing the individual to specify an ecommerce payment method. An initiation process may be performed when the individual attempts to use the software application, with the initiation process including establishing communication with the software application. Whether the individual has occupied a seat among a plurality of seats may be determined. An amount owed by the individual may be determined based at least in part on the occupancy of the seat by the individual. The ecommerce sale of the ticket may be executed via the software application using the payment method to pay the amount owed.

Various implementations of the second embodiment may include any one or more of the following features. The initiation process may include performing an authentication process, and if the authentication process is successfully completed, allowing the individual to proceed to the seat. Determining whether the individual has occupied a seat may include electronically determining a seat location of the seat occupied by the individual, and determining the amount owed may be base at least in part on the seat location. The individual may be allowed to use the mobile communications device to purchase concessions. The individual may be required to verify a relevant characteristic of the individual. The relevant characteristic may be an age of the individual and/or a membership of the individual in a particular group. Determining the occupancy of the seat may be delayed for a delay period after the individual has stopped moving. The delay period may be between one minute and five minutes. Determining the amount owed may include accounting for an applicable discount.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to processing financial transaction data by a third party in industrial, commercial, and residential applications. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments concern a system and method for sensing a seat occupancy by an individual (e.g., an attendee in a venue or a passenger in a mass transit vehicle) and executing an ecommerce transaction via a mobile communications device of the individual for the cost of a ticket for occupying the seat. Embodiments advantageously allows individuals to avoid long lines for purchasing tickets, and allows operators to reduce labor costs and develop better metrics about their customers and their customers' payment types.

Figure 1:
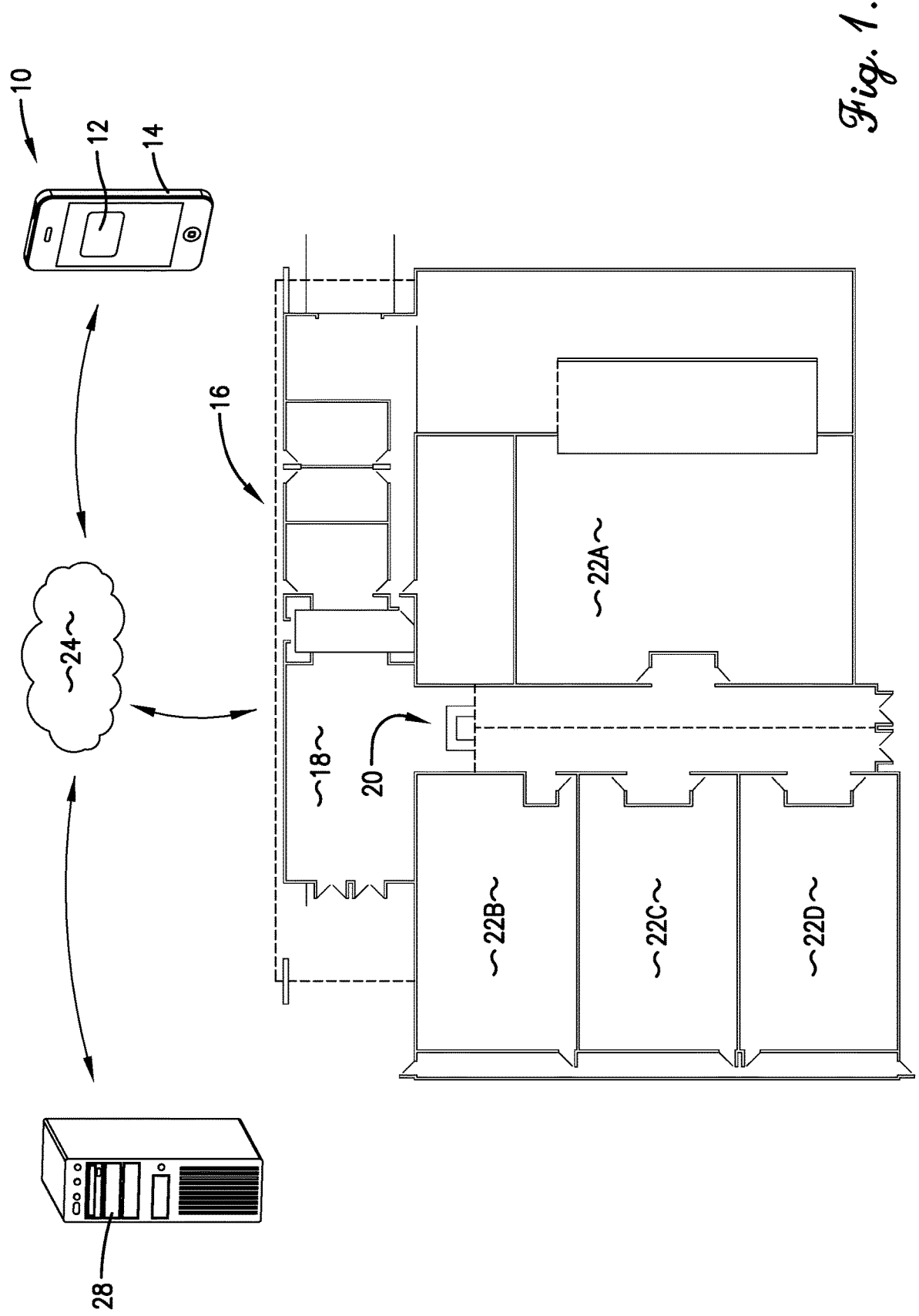
FIG. 1 is a diagram of a first embodiment of a system for ecommerce ticket sales based on seat occupancy, wherein the system is shown adapted for an exemplary multiplex cinema.
Figure 2:
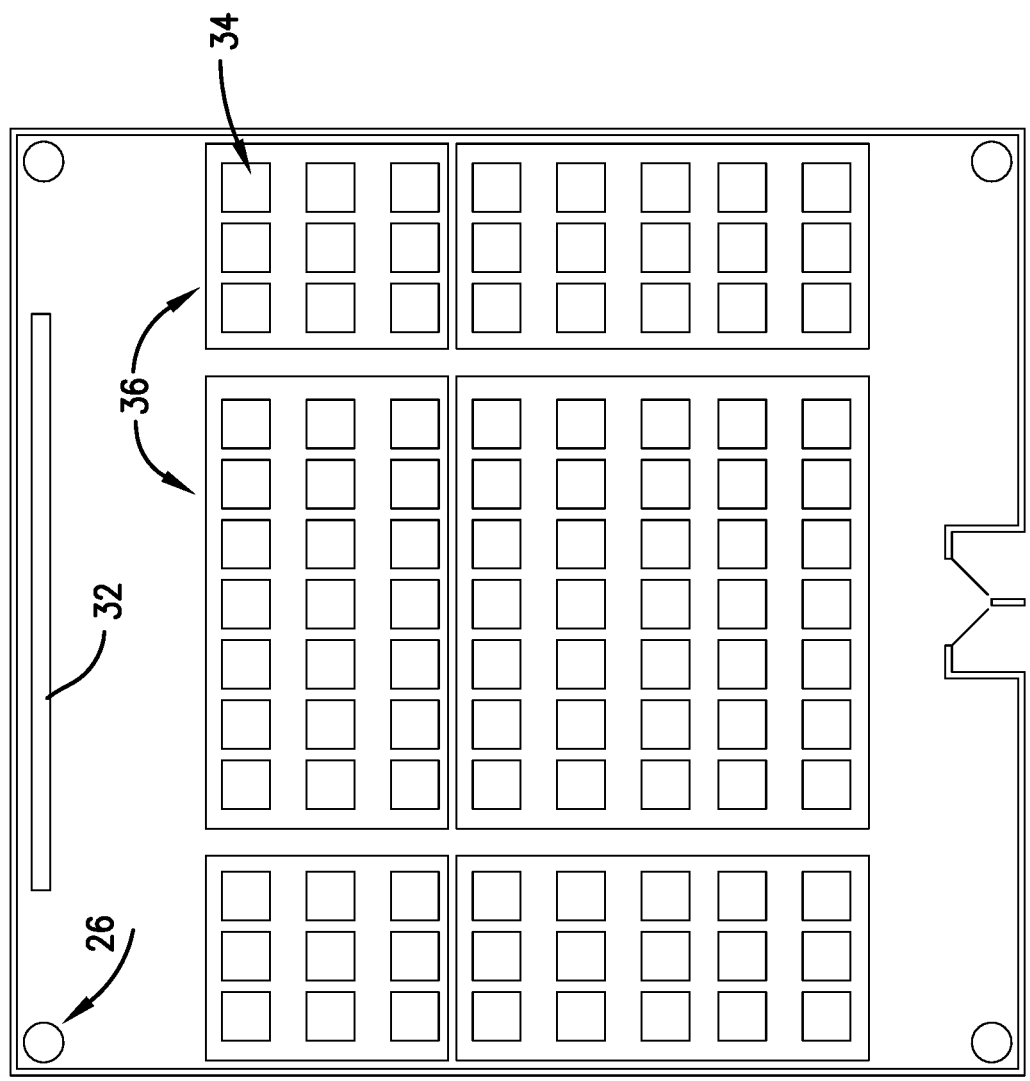
FIG. 2 is a diagram of a components of the system of FIG. 1 in a single exemplary theater of the exemplary multiplex cinema.

Referring to FIGS. 1 and 2, a first implementation of an embodiment of the system may be adapted for use in a first exemplary operating environment to allow an attendee (e.g., a payment card or other ecommerce accountholder) to walk into a venue (e.g., a theatre or stadium), use a software application ("app") on a mobile communications device (e.g., a mobile phone) to authenticate themselves (e.g., to open a turnstile or gate), choose and occupy a seat from which to watch a performance (e.g., a movie, play, or concert), have their seat occupancy detected, and then have the app on their device execute an ecommerce transaction to pay for a ticket based on their seat occupancy and any other relevant information (e.g., seat location, time, day, applicable discounts). As used herein, "seat occupancy" may generally refer to sitting in a conventional seat; while in another implementation, "seat occupancy" may further include occupying a designated seat position, such as by sitting in a wheelchair positioned in a designated space; and in another implementation, "seat occupancy" may further include occupying a space in an area designated as "standing room only."

The first implementation of the embodiment of the system 10 for facilitating an ecommerce sale of a ticket to an attendee of a performance based on an occupancy of a seat by the attendee in a venue may, along with elements of the first exemplary operating environment, broadly comprise an app 12 executable by a mobile communications device 14 carried by the attendee; a venue 16; a lobby area 18; an initiation mechanism 20; a plurality of theaters 22A,22B, 22C,22D; an electronic communications network 24; a seat occupancy sensing mechanism 26; a computing device 28.

The app 12 may be configured to perform various actions described herein to facilitate the sensing and billing of and payment by the attendee. Preliminarily, the owner of the mobile communications device 14 may download the app 12, and link or otherwise associate the downloaded app 12 with a digital wallet or payment method (e.g., credit, debit, automated clearing house (ACH) payment), and, in one implementation, a geo location service. For example, the app 12 may be associated with a payment service, such as Masterpass™ by Mastercard.

In one implementation, once the app 12 is downloaded, the owner of the mobile communications device 14 may apply for an approval check, and if the approval check is successfully completed, the owner may be approved by the venue 16 to use the app 12 when attending a performance in the venue 16. For example, at the discretion of the operator of the venue 16, potential users of the app 12 may be scrutinized based on a number of fraud-related criteria and credit scores leveraging payment card network algorithms.

The venue 16 may be substantially any suitable venue requiring payment for a ticket from an attendee. For example, the venue 16 may be a multiplex cinema (i.e., a movie theater complex having multiple screens showing different movies). The lobby area 18 may be part of the venue 16, and configured to initially receive the attendee, may allow for conventionally purchasing tickets to the performance as well as food, drink, and/or other concessions, and may provide paths for entering the various theaters 22A-D. The initiation mechanism 20 may be positioned along the paths for entering the various theaters 22A-D, and may be configured to authenticate the attendee by at least establishing initial communication with the app 12. The initiation mechanism, 20 at least serves to sense the presence of the attendee and initiate the ecommerce ticket sale, but may also be configured to control whether the attendee is permitted to even proceed to one of the theaters 22A-D. The initiation process may include an authentication process for authenticating the app 12/mobile device 14. The initiation mechanism 20 may employ substantially any suitable physical or non-physical or even virtual gating technology, such as an electronically controlled turnstile or swinging gate configured to physical impede attendees who have not been authenticated, or an electronically controlled visual and/or audible indicator configured to communicate an identification of attendees who cannot or have not been authenticated. The plurality of theaters 22A-D may also be part of the venue 16 and reachable via the initiation mechanism 20, and configured to facilitate the presentation of performances. For example, each theater 22A-D may include a screen 32 on which a movie may be shown, and a plurality of seats 34 in which attendees may sit. In one implementation, the seats 34 may be divided into a plurality of areas 36, with each area 36 being associated with a different ticket price.

The electronic communications network 24 may employ substantially any suitable wired or wireless communications technology for allowing the communications of data between other components of the system 10. The seat occupancy sensing mechanism 26 may employ substantially any suitable technology for sensing the theater 22A-D, area 36, and/or seat 34 in which the attendee is located and transmitting this information to the computing device 28 via the electronic communications network 24. In one implementation, the seat occupancy sensing mechanism 26 may take the form of a plurality of seat occupancy sensors located at particular points within the theaters 22A-D. In another implementation, the seat occupancy sensing mechanism 26 may query the app 12 to provide information from the associated geo location service. The computing device 28 may be configured to receive the information from the seat occupancy sensing mechanism 26 via the electronic communications network 24, and based on the seat occupancy of the attendee, determine an amount owed by the attendee and execute an ecommerce transaction via the attendee's mobile communications device 14 to receive payment for the amount owed. In various implementations, the relevant seat occupancy may be the particular theater 22A-D, the particular area 36, and/or the seat 34. In one implementation, the amount owed may be based on additional relevant information, such as a seat location, a time of the day, a day of the week, and/or any applicable discount (e.g., military or senior discounts). The ecommerce transaction may proceed between the attendee's mobile communications device 14 and the computing device 28 with or without interaction by the attendee. More specifically, payment for the amount owed may be accomplished substantially automatically and transparently, at least with regard to the attendee.

Figure 3:
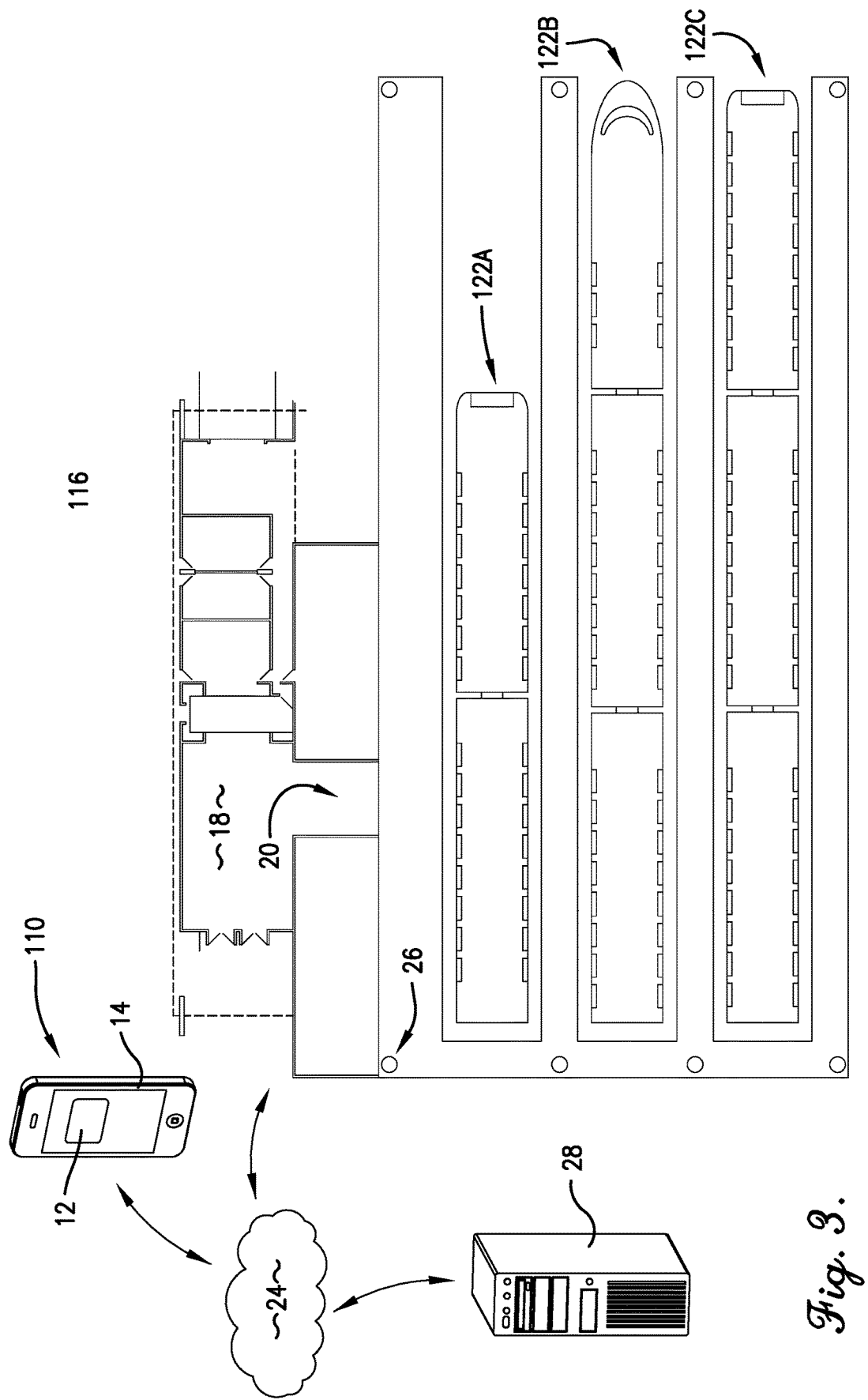
FIG. 3 is a diagram of a second embodiment of a system for ecommerce ticket sales based on seat occupancy, wherein the system is shown adapted for an exemplary train station.
Figure 4:
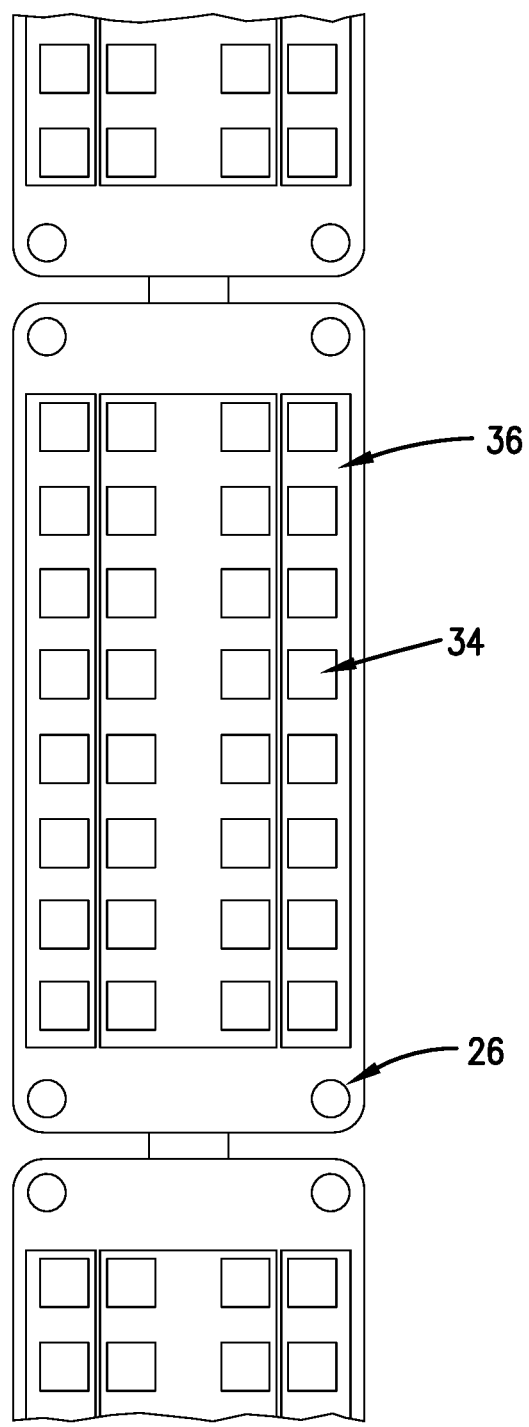
FIG. 4 is a diagram of components of the system of FIG. 3 in a single exemplary train car in the exemplary train station.

Referring to FIGS. 3 and 4, a second implementation of the embodiment of the system may be adapted for use in a second exemplary operating environment to allow a traveler (e.g., a payment card or other ecommerce accountholder) to board a mass transit vehicle (e.g., a train or ship), use an app on a mobile communications device (e.g., a mobile phone) to authenticate themselves (e.g., to open a turnstile or gate), choose and occupy a seat (e.g., a seat in a car or on a deck) from which to travel aboard the vehicle, have their seat occupancy detected, and then have the app on their device execute an ecommerce transaction to pay for a ticket based on their seat occupancy and any other relevant information (e.g., seat location, time, day, applicable discounts).

The second implementation of the embodiment of the system 110 for facilitating an ecommerce sale of a ticket to a passenger based on a seat occupancy of the passenger in a mass transit vehicle may, along with elements of the second exemplary operating environment, broadly comprise the app 12 executable by the mobile communications device 14 carried by the passenger; a station 116; the lobby area 18; the initiation mechanism 20; a plurality of vehicles 122A, 122B,122C; the electronic communications network 24; the seat occupancy sensing mechanism 26; and the computing device 28. Except as otherwise noted, many of the components and/or functionalities of the system 110 may be substantially similar or identical to the components of the same name of the first embodiment of the system 10 described above.

The station 116 may be substantially any suitable station for mass transit vehicles requiring payment from a passenger. For example, the station 116 may be a train station having multiple platforms servicing multiple trains, with each train having multiple cars. The lobby area 18 may be part of the station 116 and configured to initially receive the passenger, and may allow for conventionally purchasing tickets for traveling on the vehicles 122A-C as well as food and drink and/or other concessions, and may provide platforms for reaching the various vehicles 122A-C. The plurality of vehicles 122A-C may be received in the station 116 and reachable via the initiation mechanism 20, and configured to provide transportation to various destinations. For example, each vehicle 122A-C may include multiple cars, and each car may include a plurality of seats 34 in which passengers may sit. In one implementation, the seats 34 may be divided into a plurality of areas 36 (e.g., aisle, window, back, front) in each car, with each area 36 being associated with a different ticket price.

The seat occupancy sensing mechanism 26 may employ substantially any suitable technology for sensing the seat occupancy of the passenger and transmitting this information to the computing device 28 via the electronic communications network 24. In one implementation, the seat occupancy sensing mechanism 26 may take the form of a plurality of seat occupancy sensors located at particular points within the station 116 and/or within the vehicles 122.

The computing device 28 may be configured to receive the information from the seat occupancy sensing mechanism 26 via the electronic communications network 24, and based on the occupancy of the seat by the passenger, determine an amount owed by the passenger and execute an ecommerce transaction via the passenger's mobile communications device 14 to receive payment for the amount owed. In various implementations, the relevant seat occupancy may be the particular vehicle 122, the particular area 34, and/or the seat 34. The ecommerce transaction may proceed between the passenger's mobile communications device 14 and the computer device 28 with or without interaction by the passenger. More specifically, payment for the amount owed may be accomplished substantially automatically and transparently, at least with regard to the passenger.

In addition to the described first and second implementations, it will be understood that the present invention may be adapted for use with substantially any applications which similarly employ location-based ticket pricing.

The systems 10,110 may include more, fewer, or alternative components and/or perform more, fewer, or alternative actions, including those discussed elsewhere herein, and particularly those discussed in the following section describing the method.

Figure 5:
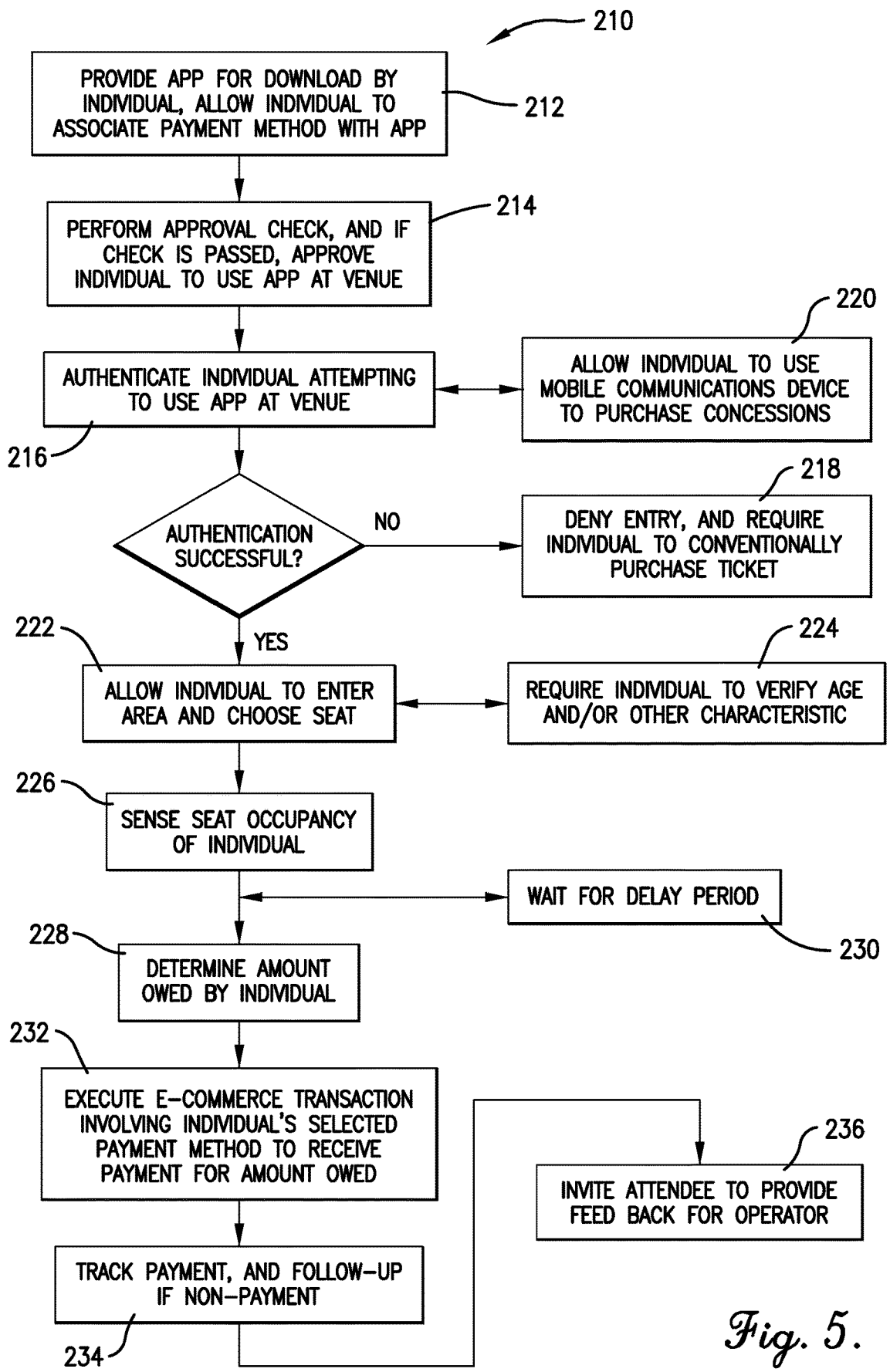
FIG. 5 is a flowchart of steps involved in an embodiment of a method for ecommerce ticket sales based on seat occupancy; and The figures are not intended to limit the present invention to the specific embodiments they depict. The drawings are not necessarily to scale.

Referring to FIG. 5, an embodiment of the method 210 is shown for facilitating an ecommerce sale of a ticket to an individual based on a seat occupancy by the individual. The method 210 may be a corollary to the functionality of the above-described systems 10,110, and may be similarly implemented using the various components of the systems 10,110 within the above-described exemplary operating environments. Broadly, the method 210 may proceed as follows.

Preliminarily, the app 12 may be provided for download by the individual, and the individual may be allowed to link or otherwise associate a payment method with the downloaded app 12, as shown in 212. For example, an owner of a mobile communications device 12 may download the app 12 onto the mobile device 14, and associate the app 12 with a digital wallet or payment method (e.g., credit, debit, automated clearing house (ACH) payment). This step may further include associating the app 12 with a geo location service.

An approval check may be performed, and if the check is completed, the individual may be approved to use the app 12, as shown in 214. For example, once the app 12 is downloaded, the owner of the mobile device 14 may initiate an approval check, and if the approval check is successfully completed, the individual may be approved to use the app 12 in, e.g., a venue 16 or in a station 116.

Thereafter, when the individual attempts to use the app 12, an initiation process may be performed, as shown in 218. The initiation process may include an authentication process for authenticating the app 12/mobile device 14. For example, the individual may enter a lobby 18 of the venue 16 or station 116. The individual may approach an initiation mechanism 20, at least initial communication may be established between the mobile device 14 and the initiation mechanism 20, and the individual may be authenticated, as shown in 216. If the individual is not successfully authenticated, they may be denied entry and required to conventionally purchase a ticket, as shown in 218. In one implementation, the individual may be allowed to use the mobile device 14 to purchase food and drink and/or other items for sale in a concessions area of the lobby 18 by passing through a self-serve-enabled portion of the concessions area, as shown in 220. In various implementations, such purchases may occur before and/or after the initiation step.

If the individual is successfully authenticated, then they may be allowed to proceed and to choose a seat to occupy (in, e.g., a theater 22 or train 122 of their choice), as shown in 222.

In one implementation, the individual may be required to verify a relevant characteristic, as shown in 224. For example, the individual may be required to verify their age using biometric or other suitable technology prior to being allowed to proceed into the theater 22, or the individual may be required to verify a characteristic relevant to receiving a discount (e.g., senior or military discounts) using biometric or other suitable technology prior to being allowed to claim the discount. In more detail, information provided for the approval check may include the relevant characteristic (e.g., age or military status), but the actual individual using the device 14 may be required to confirm (using, e.g., facial recognition or fingerprint recognition technologies) that they are the person who completed the approval check and are therefore over the minimum age and/or are a member of a particular group or otherwise entitled to a discount.

Once the individual has chosen their desired seat 34, the seat occupancy may be determined, as shown in 226. A computing device 28 may receive the seat occupancy information from a seat occupancy sensing mechanism 26 via an electronic communications network 24, and based on the seat occupancy of the individual and any other considerations (e.g., seat location, time, day, applicable discounts), determine an amount owed by the individual, as shown in 228. The determination of the amount owed may be delayed until the individual has stopped moving for a predetermined delay period of time (i.e., until they have clearly chosen and committed to their desired seat 34), as shown in 230, wherein the delay period may be between one (1) and five (5) minutes, or between one (1) and (2) minutes. In one implementation, the delay period may be shortened to one (1) minute once the performance has begun or the vehicle has started moving.

The computing device 28 may then execute an ecommerce transaction via the app 12, with or without interaction by the individual, to receive payment for the amount owed, as shown in 232. The individual and/or the venue 16 or station 116 may receive receipts for the completed transaction. All payments may be tracked and all non-payments may be flagged for any individuals who remained in a theater 22A-D or train 122A-C for longer than a predetermined time limit, as shown in 234. The individual may be invited to complete a survey or otherwise provide feedback regarding their experience, as shown in 236, and the feedback may be provided to the venue 16 or station 116.

The computer-implemented method 210 may include more, fewer, or alternative actions, including those discussed elsewhere herein.

Any actions, functions, steps, and the like recited herein may be performed in the order shown in the figures and/or described above, or may be performed in a different order. Furthermore, some steps may be performed concurrently as opposed to sequentially. Although the computer-implemented method is described above, for the purpose of illustration, as being executed by an exemplary system and/or exemplary physical elements, it will be understood that the performance of any one or more of such actions may be differently distributed without departing from the spirit of the present invention.

A computer-readable medium comprising a non-transitory medium may include an executable computer program stored thereon and for instructing one or more processing elements to perform some or all of the steps described herein, including some or all of the steps of the computer-implemented method. The computer program stored on the computer-readable medium may instruct the processing element and/or other components of the system to perform additional, fewer, or alternative actions, including those discussed elsewhere herein.

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

The terms "processing element," "processor," and the like, as used herein, may, unless otherwise stated, broadly refer to any programmable system including systems using central processing units, microprocessors, microcontrollers, reduced instruction set circuits (RISC), application specific integrated circuits (ASIC), logic circuits, and any other circuit or processor capable of executing the functions described herein. The above examples are example only, and are thus not intended to limit in any way the definition and/or meaning of the term "processing element." In particular, "a processing element" may include one or more processing elements individually or collectively performing the described functions. In addition, the terms "software," "computer program," and the like, may, unless otherwise stated, broadly refer to any executable code stored in memory for execution on mobile devices, clusters, personal computers, workstations, clients, servers, and a processor or wherein the memory includes read-only memory (ROM), electronic programmable read-only memory (EPROM), random access memory (RAM), erasable electronic programmable read-only memory (EEPROM), and non-volatile RAM (NVRAM) memory. The above memory types are exemplary only, and are thus not limiting as to the types of memory usable for storage of a computer program.

The terms "computer," "computing device," and the like, as used herein, may, unless otherwise stated, broadly refer to substantially any suitable technology for processing information, including executing software, and may not be limited to integrated circuits referred to in the art as a computer, but may broadly refer to a microcontroller, a microcomputer, a programmable logic controller (PLC), an application specific integrated circuit, and other programmable circuits, and these terms are used interchangeably herein.

The term "communications network" and the like, as used herein, may, unless otherwise stated, broadly refer to substantially any suitable technology for facilitating communications (e.g., GSM, CDMA, TDMA, WCDMA, LTE, EDGE, OFDM, GPRS, EV-DO, UWB, WiFi, IEEE 802 including Ethernet, WiMAX, and/or others), including supporting various local area networks (LANs), personal area networks (PAN), or short range communications protocols.

The term "communications element" and the like, as used herein, may, unless otherwise stated, broadly refer to substantially any suitable technology for facilitating communications, and may include one or more transceivers (e.g., WWAN, WLAN, and/or WPAN transceivers) functioning in accordance with IEEE standards, 3GPP standards, or other standards, and configured to receive and transmit signals via a communications network.

The term "memory element," "data storage device," and the like, as used herein, may, unless otherwise stated, broadly refer to substantially any suitable technology for storing information, and may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for facilitating an ecommerce sale of a ticket to an individual based on a seat occupancy by the individual, the system comprising:
   a software application for downloading onto a mobile communications device, with the software application allowing the individual to specify an ecommerce payment method;
   an initiation mechanism configured to detect a presence of the mobile communications device;
   a seat occupancy determining mechanism configured to determine whether the individual has occupied a seat among a plurality of seats; and
   a computing device configured to—
      determine an amount owed by the individual based at least in part on the occupancy of the seat by the individual, and
      execute the ecommerce sale of the ticket via the software application using the ecommerce payment method to pay the amount owed.

2. The system of claim 1, wherein the initiation mechanism includes a gate configured to initiate an authentication process, and if the authentication process is successfully completed, allow the individual to proceed to the seat.

3. The system of claim 1, wherein the seat occupancy determining mechanism is configured to determine a seat location of the seat occupied by the individual, and the computing device is configured to determine the amount owed by the individual based at least in part on the seat location.

4. The system of claim 1, further including a point-of-sale transaction system configured to allow the individual to use the mobile communications device to purchase concessions.

5. The system of claim 1, wherein the computing device is further configured to require the individual to verify a relevant characteristic of the individual.

6. The system of claim 5, wherein the relevant characteristic is an age of the individual.

7. The system of claim 5, wherein the relevant characteristic is a membership of the individual in a particular group.

8. The system of claim 1, wherein the computing device is further configured to delay determining the occupancy of the seat for a delay period after the individual has stopped moving.

9. The system of claim 8, wherein the delay period is between one minute and five minutes.

10. The system of claim 1, wherein the computing device is further configured to account for an applicable discount when determining the amount owed.

11. A system for facilitating an ecommerce sale of a ticket to an individual based on a seat occupancy by the individual, the system broadly comprising:
   a software application for downloading onto a mobile communications device, with the software application allowing the individual to specify an ecommerce payment method;
   a point-of-sale transaction system configured to allow the individual to use the mobile communications device to purchase concessions;
   an initiation mechanism configured to detect a presence of the mobile communications device, the initiation mechanism including a gate configured to initiate an authentication process, and if the authentication process is successfully completed, allow the individual to proceed;
   a seat occupancy determining mechanism configured to determine whether the individual has occupied a seat among a plurality of seats; and
   a computing device configured to—
      wait for a delay period after the individual has stopped moving, wherein the delay period is between one minute and five minutes,
      require the individual to verify a relevant characteristic of the individual,
      determine an amount owed by the individual based at least in part on the occupancy of the seat by the individual, and
      execute the ecommerce sale of the ticket via the software application using the ecommerce payment method to pay the amount owed.

12. A method for facilitating an ecommerce sale of a ticket to an individual based on a seat occupancy by the individual, the method broadly comprising:

(a) providing a software application for downloading onto a mobile communications device, with the software application allowing the individual to specify an ecommerce payment method;

(b) performing an initiation process when the individual attempts to use the software application, the initiation process including establishing communication with the software application;

(c) electronically determining whether the individual has occupied a seat among a plurality of seats;

(d) determining an amount owed by the individual based at least in part on the occupancy of the seat by the individual; and (e) executing the ecommerce sale of the ticket via the software application using the payment method to pay the amount owed.

13. The method of claim 12, wherein step (b) includes the step of performing an authentication process, and if the authentication process is successfully completed, allowing the individual to proceed to the seat.

14. The method of claim 12, wherein step (c) includes the step of electronically determining a seat location of the seat occupied by the individual, and step (d) includes the step of determining the amount owed by the individual based at least in part on the seat location.

15. The method of claim 12, further including allowing the individual to use the mobile communications device to purchase concessions.

16. The method of claim 12, further including requiring the individual to verify a relevant characteristic of the individual.

17. The method of claim 16, wherein the relevant characteristic is an age of the individual and/or a membership of the individual in a particular group.

18. The method of claim 12, further including delaying determining the occupancy of the seat for a delay period after the individual has stopped moving.

19. The method of claim 18, wherein the delay period is between one minute and five minutes.

20. The method of claim 12, further including accounting for an applicable discount when determining the amount owed.

* * * * *